US012538102B2

(12) United States Patent
Hamada

(10) Patent No.: US 12,538,102 B2
(45) Date of Patent: Jan. 27, 2026

(54) WIRELESS COMMUNICATION APPARATUS, WIRELESS NETWORK MANAGEMENT APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Masashi Hamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 712 days.

(21) Appl. No.: 17/872,098

(22) Filed: Jul. 25, 2022

(65) Prior Publication Data
US 2023/0063263 A1    Mar. 2, 2023

(30) Foreign Application Priority Data

Aug. 24, 2021 (JP) .................................. 2021-136654

(51) Int. Cl.
*H04W 4/00* (2018.01)
*H04W 4/12* (2009.01)
(Continued)

(52) U.S. Cl.
CPC .............. *H04W 4/12* (2013.01); *H04W 8/005* (2013.01); *H04W 88/184* (2013.01)

(58) Field of Classification Search
None
See application file for complete search history.

(56) References Cited

U.S. PATENT DOCUMENTS 8,761,049 B2  6/2014  Hamada
9,491,791 B2  11/2016  Hamada
(Continued)

FOREIGN PATENT DOCUMENTS

CN       110831174 A    2/2020
JP       2020-114031 A  7/2020
(Continued)

OTHER PUBLICATIONS

ZTE Corporation "Discussion on Remaining issues on L3 relay" 3GPP TSG-RAN WG2, Meeting #112-e, R2-2009033 (Oct. 2020) pp. 1-5.

(Continued)

*Primary Examiner* — Gerald A Smarth
(74) *Attorney, Agent, or Firm* — Carter, DeLuca & Farrell LLP

(57) ABSTRACT

There is provided a wireless communication apparatus comprising: a first wireless communication unit configured to perform wireless communication with a base station; a second wireless communication unit configured to perform wireless communication between wireless communication apparatuses not via a base station; a reception unit configured to receive a message from the second wireless communication apparatus via the second wireless communication unit, the message notifying that an informing signal transmitted from a first base station belonging to a first wireless communication system to which the wireless communication apparatus belongs is received by a second wireless communication apparatus belonging to a second wireless communication system different from the first wireless communication system; and a notification unit configured to notify the first base station that the message is received by the reception unit, via the first wireless communication unit.

11 Claims, 12 Drawing Sheets

(51) Int. Cl.
  *H04W 8/00* (2009.01)
  *H04W 88/18* (2009.01)

(56) References Cited

U.S. PATENT DOCUMENTS

| | | | |
|---|---|---|---|
| 9,974,104 B2 | 5/2018 | Hamada | |
| 2015/0230142 A1* | 8/2015 | Yang | H04W 36/38 |
| | | | 370/331 |
| 2017/0332317 A1* | 11/2017 | Nuggehalli | H04W 76/15 |
| 2020/0260463 A1 | 8/2020 | Lovlekar | |
| 2021/0227375 A1 | 7/2021 | Hamada | |
| 2024/0422600 A1* | 12/2024 | Krishnan | H04W 24/10 |

FOREIGN PATENT DOCUMENTS

| | | | | |
|---|---|---|---|---|
| JP | 2020-156042 A | | 9/2020 | |
| WO | WO-2017046978 A1 * | | 3/2017 | H04W 76/10 |
| WO | WO-2020257187 A1 * | | 12/2020 | H04W 68/025 |

OTHER PUBLICATIONS

Intel Corporation "LTE sidelink communication under NR Uu control" 3GPP TSG RAN WG1, Meeting #99, R1-1912210 (Nov. 2019) pp. 1-6.
Chinese Office Action issued by the China National Intellectual Property Administration on Nov. 25, 2025 in corresponding CN Patent Application No. 202210998310.1, with English translation.

* cited by examiner

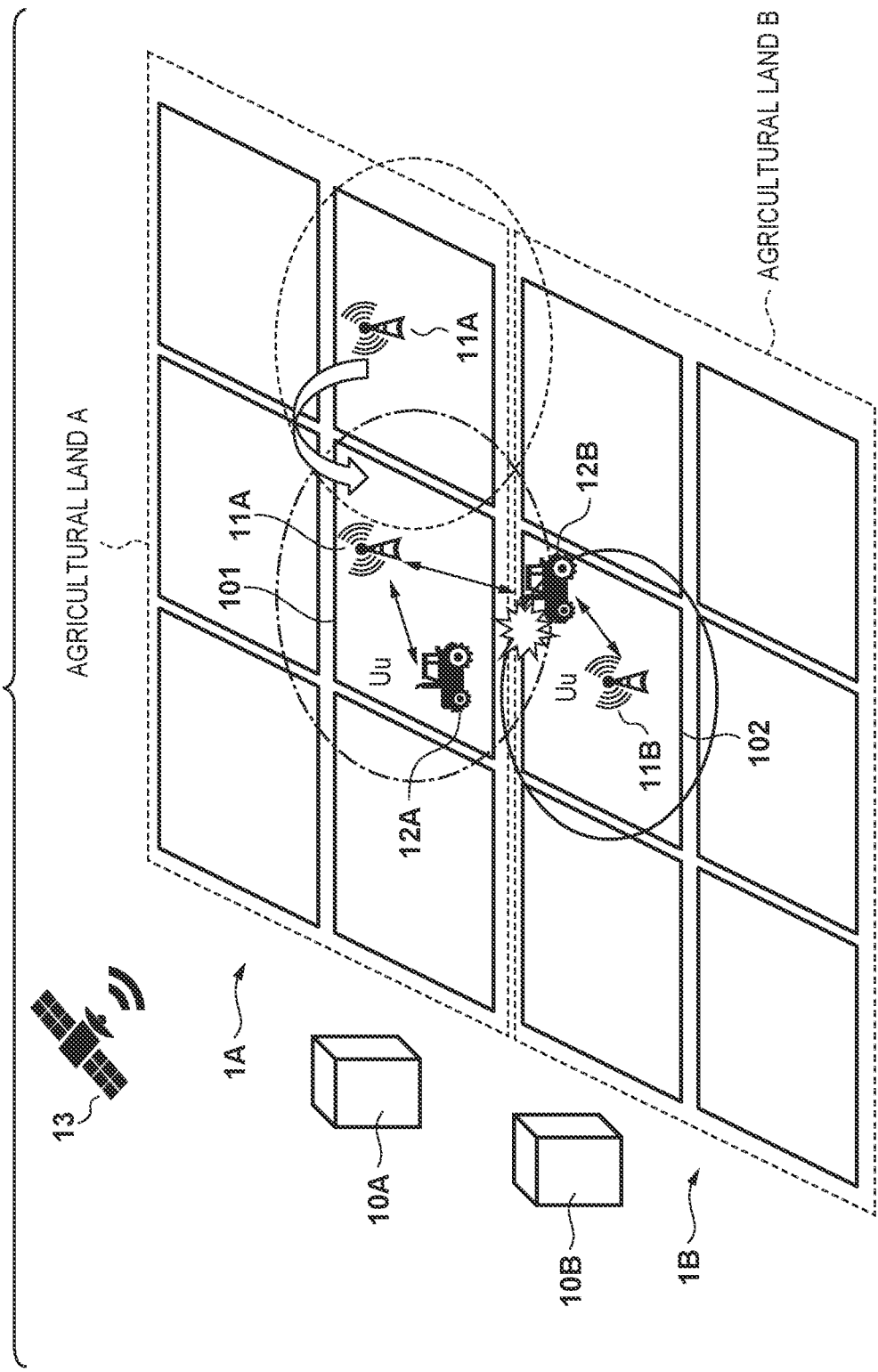
F I G. 1

WIRELESS COMMUNICATION APPARATUS, WIRELESS NETWORK MANAGEMENT APPARATUS, CONTROL METHOD, AND NON-TRANSITORY COMPUTER-READABLE STORAGE MEDIUM

BACKGROUND OF THE INVENTION

Field of the Invention

The present invention relates to a wireless communication apparatus, a wireless network management apparatus, a control method, and a non-transitory computer-readable storage medium for collecting information about a wireless communication system of the same type that is operating in the neighborhood.

Description of the Related Art

Japanese Patent Laid-Open No. 2020-156042 discloses a system in which a plurality of wireless cellular network systems are installed in the same area and a wireless system to be used is selected in consideration of a load condition.

Japanese Patent Laid-Open No. 2020-114031 discloses a system that accesses a backbone wireless network via another wireless communication apparatus using a wireless communication medium for wireless communication (direct wireless communication) between devices not via a base station.

Also, there is a control system that performs an unmanned operation in a private land such as a farm and a quarry by independently installing such a wireless cellular network system in the private land and cooperatively operating devices equipped with a cellular communication function.

In the control method described in Japanese Patent Laid-Open No. 2020-156042, an adjustment operation by a licensee of a wireless network system to secure a wireless channel to be assigned to a wireless communication apparatus is necessary in order to prevent the occurrence of an interference with a wireless communication apparatus of another system, which is a burden on the licensee.

As described above, in constructing a wireless communication system, it has been an issue to detect the likelihood that transmission of a signal in a wireless communication system would interfere with communication in another wireless communication system.

SUMMARY OF THE INVENTION

The present invention has been made in view of the issue described above, and an object thereof is to provide a technique for enabling the detection of the likelihood that transmission of a signal in a wireless communication system would interfere with communication in another wireless communication system.

In order to achieve the object described above, a wireless communication apparatus according to an aspect of the present invention includes: a first wireless communication unit configured to perform wireless communication with a base station; a second wireless communication unit configured to perform wireless communication between wireless communication apparatuses not via a base station; a reception unit configured to receive a message from the second wireless communication apparatus via the second wireless communication unit, the message notifying that an informing signal transmitted from a first base station belonging to a first wireless communication system to which the wireless communication apparatus belongs is received by a second wireless communication apparatus belonging to a second wireless communication system different from the first wireless communication system; and a notification unit configured to notify the first base station that the message is received by the reception unit, via the first wireless communication unit.

Further features of the present invention will become apparent from the following description of exemplary embodiments (with reference to the attached drawings).

BRIEF DESCRIPTION OF THE DRAWINGS

FIG. 1 is a schematic diagram illustrating a situation in which an interference occurs between wireless communication apparatuses belonging to different wireless communication network systems.

DESCRIPTION OF THE EMBODIMENTS

Figure 2:
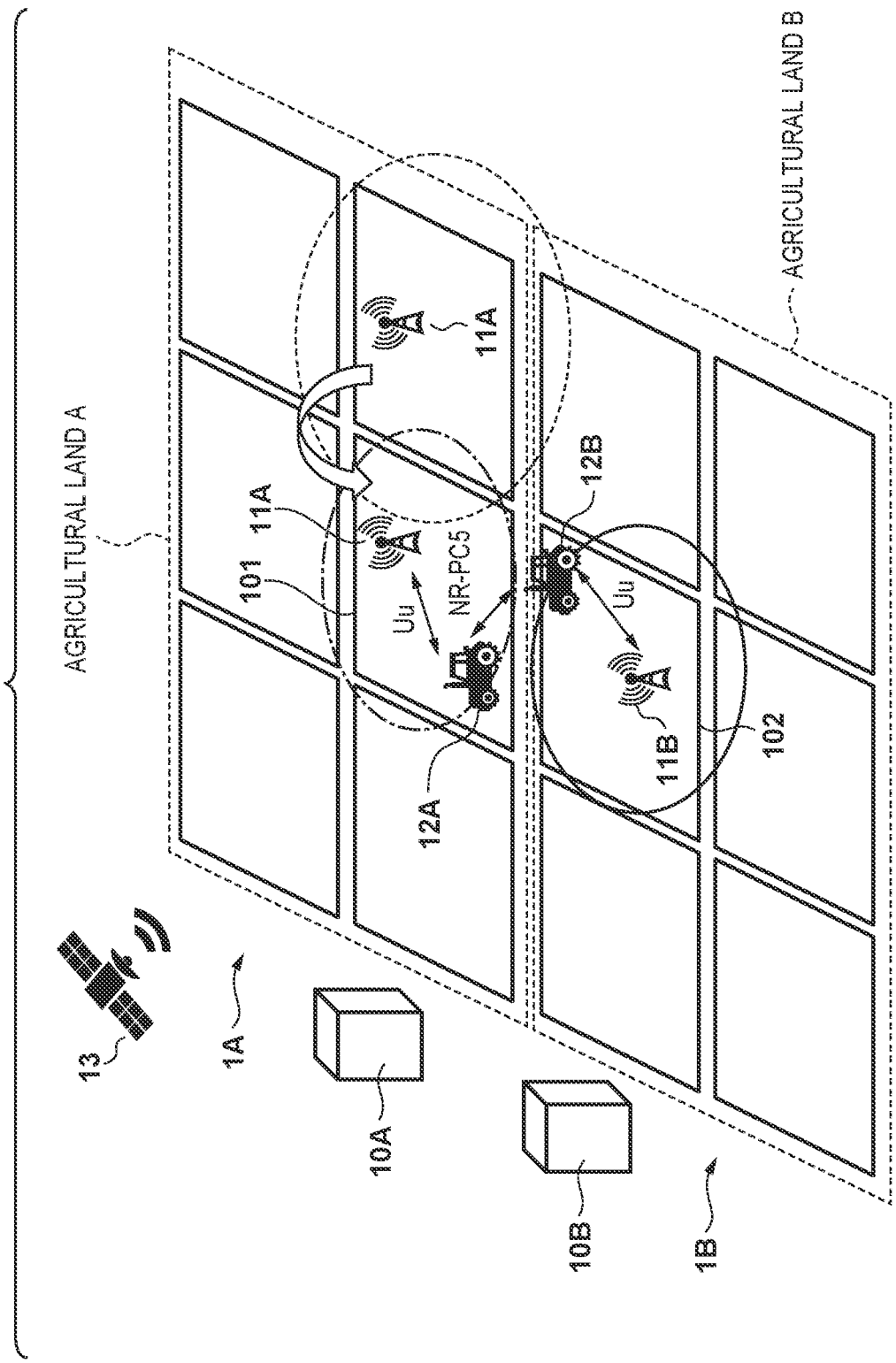
FIG. 2 is a schematic diagram illustrating a wireless communication system according to a present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

First, a situation in which an interference occurs between different wireless communication systems will be described with reference to FIG. 1. Note that, in the present embodiment, a wireless communication system is described as an agricultural system to which a wireless local network (a local 5G wireless communication network) compliant with the fifth generation mobile communication system is applied.

In an agricultural system, it is assumed that an indication related to an automatic control is given to an agricultural machine operating in an agricultural land, and information such as an operating status of the agricultural machine is collected. In such an agricultural system, an area in which an agricultural machine is present may be designated as a service area, and it may be redundant to designate the entire agricultural land as a service area. Therefore, introduction of a system that provides a wireless communication network while moving a wireless base station for a local 5G depending on an area (an operating location) in which an agricultural machine is present is being promoted.

FIG. 1 illustrates an example of a system configuration in which an automatic control solution for an agricultural machine (a tractor or the like) compatible with a local 5G wireless communication control is introduced in adjacent agricultural lands A and B. The agricultural machine (a tractor or the like) is assumed to automatically travel on a public road, and thus supports a direct wireless communication between wireless communication apparatuses not via a base station in which a system synchronization operation by a satellite communication is guaranteed, to acquire information from road-side devices such as road signs and traffic lights. In the present embodiment, the direct wireless communication is described as a wireless communication between wireless communication apparatuses using an NR-PC5 interface.

A local 5G wireless communication system 1A for the agricultural land A includes a wireless network management apparatus 10A, a wireless base station (BS) 11A, and an agricultural machine mounted with a wireless communication apparatus (UE) 12A. A local 5G wireless communication system 1B for the agricultural land B includes a wireless network management apparatus 10B, a BS 11B, and an agricultural machine mounted with a UE 12B. The UE 12A and the UE 12B (hereinafter, may be referred to as a wireless communication apparatus 12 or a UE 12 without distinction) mounted on the agricultural machines support a communication using NR-PC5 that is a direct wireless communication interface for supporting automatic operation of the agricultural machines. Further, the UE 12 supports a communication using Uu that is a wireless communication interface for accessing an agricultural work management server or the like via a base station.

In view of coexistence with the NR-PC5, the BS 11A and the BS 11B (hereinafter, may be referred to as BS 11 without distinction) and the UE 12 support a satellite positioning system GNSS 13, and can acquire location information and time information.

Furthermore, a deviation width of a timing of wireless time-division multiplex (TDD) communication is reduced by synchronizing system clocks used for the operations of the wireless communication apparatuses based on the time information acquired from the GNSS.

The agricultural lands A and B are divided into areas each of which can be covered by one BS 11 (6 areas in the example of FIG. 1), and agricultural work is performed in each area using an automatically-operated tractor mounted with the UE 12.

Upon completion of the agricultural work in one area of the agricultural land A, the wireless base station BS 11A moves to an area 101 (the area adjacent to an area 102 of the agricultural land B in which the agricultural work is being executed) in which the agricultural work is planned to be executed next, and then reboots.

In a case where the agricultural work is executed in the areas 101 and 102 and service areas are formed by the BS 11 in these adjacent areas, asynchronous local 5G wireless communication systems may cause a radio frequency interference between the wireless communication apparatuses depending on a transmission/reception pattern (a TDD pattern).

FIG. 2 illustrates a wireless communication system according to the present embodiment that is applied to an agricultural system of the local 5G wireless communication system.

In a work area of an agricultural machine mounted with the UE 12B in the agricultural land B, upon reception of an informing signal transmitted from the BS 11A, the UE 12B transmits to the UE 12A via the direct wireless communication a notification message notifying that the informing signal is received. The UE 12A notifies the BS 11A that the notification message is received from the UE 12B so that communication parameters can be adjusted to prevent the communication between the BS 11A and the UE 12A from interfering with the communication between the UE 12B and the BS 11B.

Figure 3:
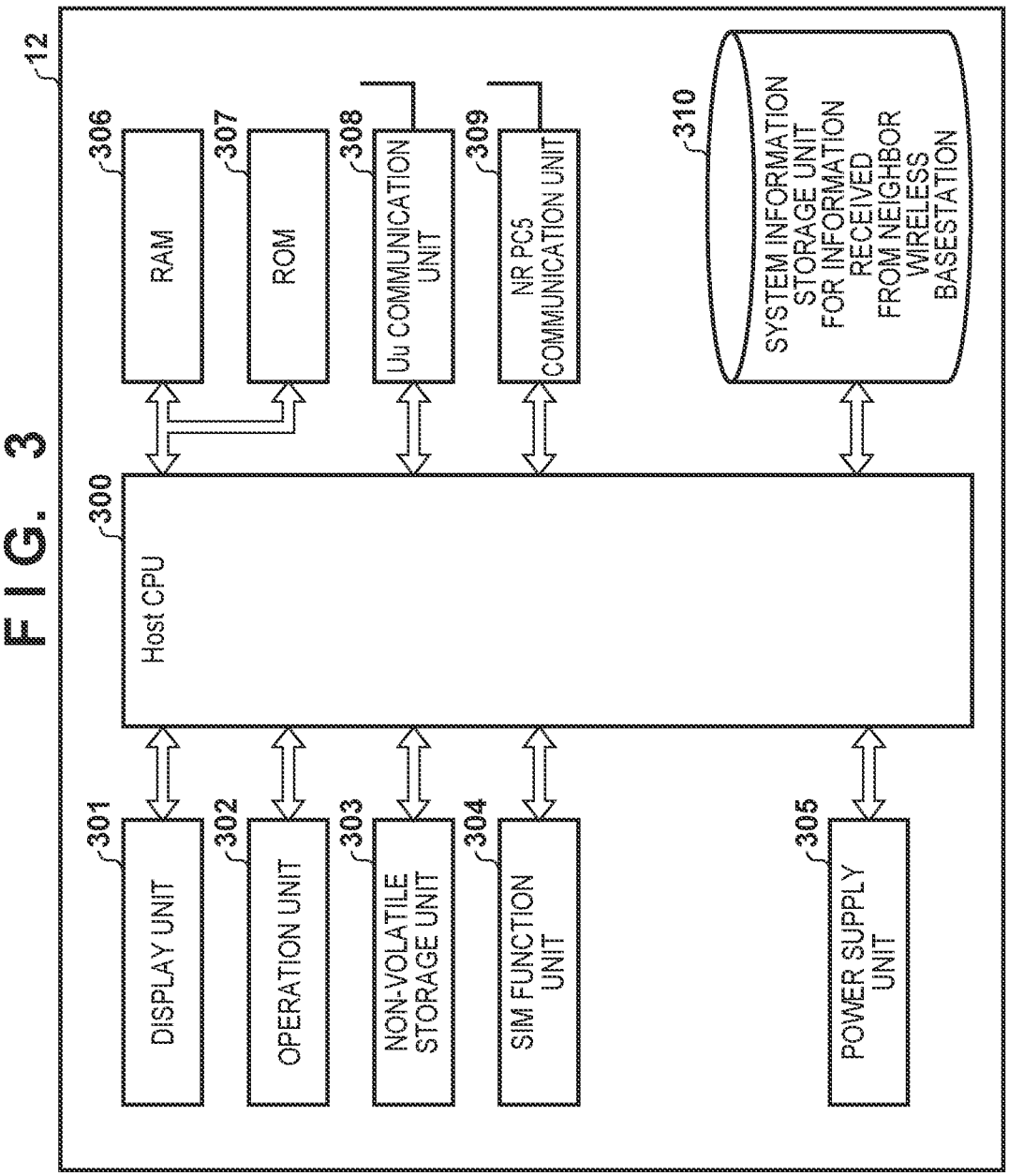
FIG. 3 is a functional block diagram of the wireless communication apparatus according to the present embodiment.

Next, a functional block of the UE 12 will be described with reference to FIG. 3.

The UE 12 includes a central processing unit (CPU) 300, a display unit 301, an operation unit 302, a non-volatile storage unit 303 such as a memory card, a subscriber identification module (SIM) function unit 304, a power supply unit 305, a RAM 306, and a ROM 307. The UE 12 further includes an NR-Uu communication unit 308 used for a communication with the BS 11, and an NR-PC5 communication unit 309 used for the direct wireless communication. The UE 12 still further includes a system information storage unit 310 that stores information about an informing signal received from a wireless communication system different from the wireless communication system to which the UE 12 belongs. The CPU 300 is a control unit that controls the entire UE, and deploys a program, stored in the ROM 307 or the non-volatile storage unit 303, into the RAM 306 and executes the program. The display unit 301 is a display device configured to make a predetermined notification to a user, and is, for example, a touchscreen in a case where the UE 12 is a smartphone. The operation unit 302 is a user interface (UI) that receives an operation from a user, and is, for example, a touchscreen in a case where the UE 12 is a smartphone.

The SIM function unit 304 is a module that includes subscriber identification information for connecting to a wireless communication system 1 as the UE 12, and executes authentication processing and the like for connecting to the wireless communication system 1.

Figure 4:
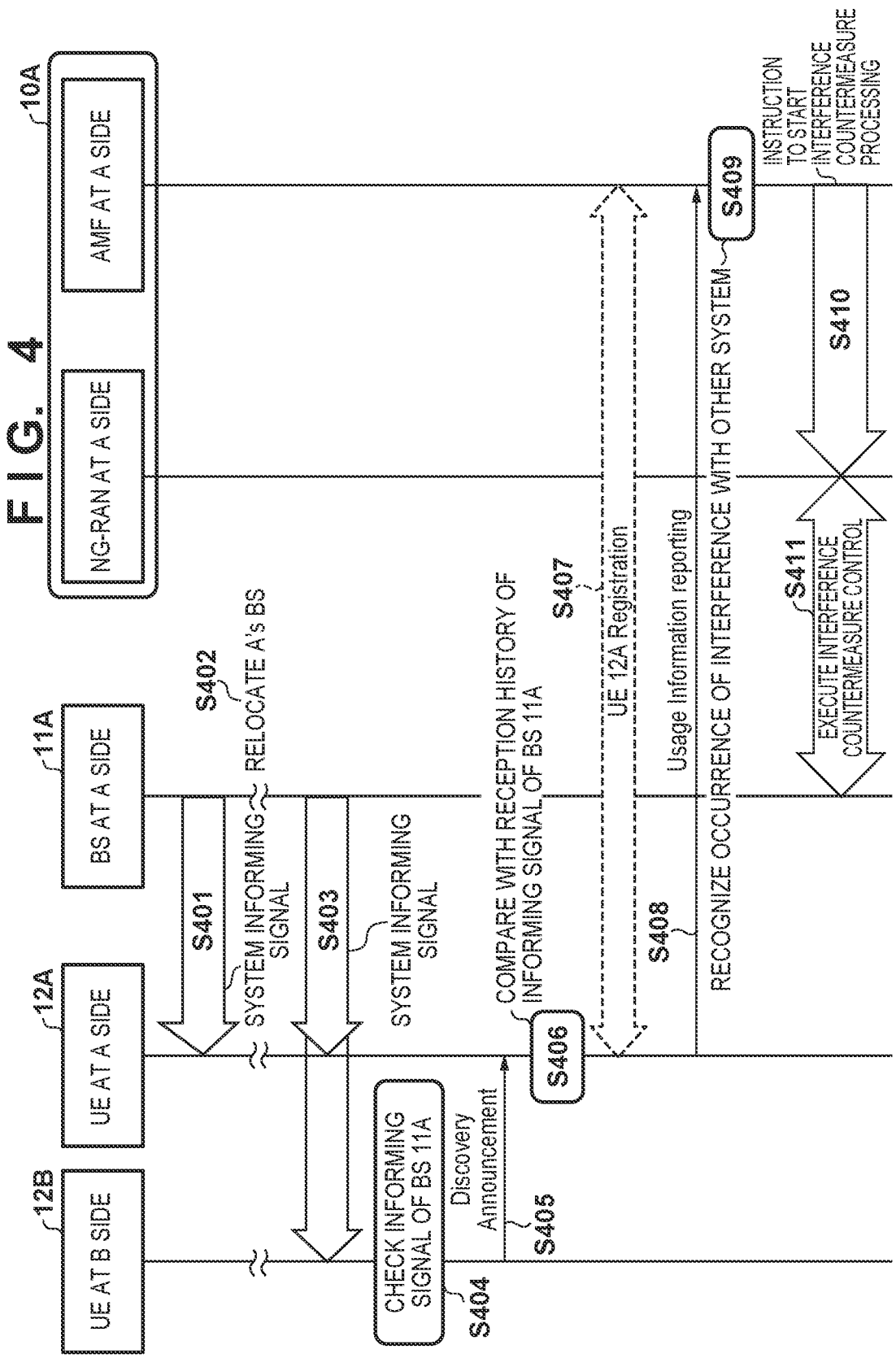
FIG. 4 is a sequence diagram illustrating an example of processing executed by a wireless communication system according to a first embodiment when wireless communication apparatuses come close to each other.

Next, an example of processing executed by a wireless communication system according to a first embodiment when wireless communication apparatuses come close to each other will be described with reference to FIG. 4.

First, in S401, the BS 11A broadcasts a system informing signal, and the UE 12A receives the system informing signal. Upon reception of the system informing signal, the UE 12A establishes a connection with the BS 11A using a publicly known technique such as a procedure for random access to the BS 11A.

Then, in S402, a control signal indicating movement is transmitted via the BS 11A to an agricultural machine mounted with the UE 12A, and thereby the agricultural machine mounted with the UE 12A moves to an area adjacent to a system B. The BS 11A also moves to the corresponding area.

Here, it is assumed that the UE 12B has established a connection with the BS 11B, an agricultural machine mounted with the UE 12B operates in the area 102 in FIG. 2, and the agricultural machine mounted with the UE 12A operates in the area 101 in FIG. 2.

Subsequently, in S403, the BS 11A broadcasts a system informing signal in the area after the movement, and the UE 12A and the UE 12B receive the system informing signal.

Subsequently, in S404, the UE 12B acquires information included in the system informing signal received from the BS 11A, and determines whether or not the informing signal is from the same wireless communication system as the BS 11B to which the UE 12B is connected. In S405, when it is determined that the informing signal is from a wireless communication system different from the BS 11B, the UE 12B transmits a discovery announcement message that is a message format for a broadcast notification, to the UE 12A by the direct wireless communication.

In S406, the UE 12A that has received the discovery announcement message from the UE 12B in S405 compares a reception history of informing signals received from the BS 11A with the discovery announcement message. When the comparison result shows that an informing signal included in the reception history of informing signals received from the BS 11A is also received by the UE 12B, the informing signal from the BS 11A in which the UE 12A is participating is determined to have received by a wireless communication apparatus of another wireless communication system.

When it is determined that the system informing signal from the BS 11A in which the UE 12A is participating is received by the wireless communication apparatus of the other wireless communication system, the UE 12A registers the UE 12A to the wireless network management apparatus 10A in S407, and causes the processing to proceed to S408 to transmit a message (Usage Information Reporting message) representing that the system informing signal from the BS 11A in which the UE 12A is participating is received by the wireless communication apparatus of the other wireless communication system.

Then, the processing proceeds to S409 where the wireless network management apparatus 10A detects an interference with the other wireless communication system based on the information received in S407, and, subsequently in S410, AMF of the wireless network management apparatus 10A indicates NG-RAN to execute processing to prevent the interference.

Subsequently, in S411, the NG-RAN of the wireless network management apparatus 10A transmits to the BS 11A an interference prevention indication to be described later.

Figure 5:
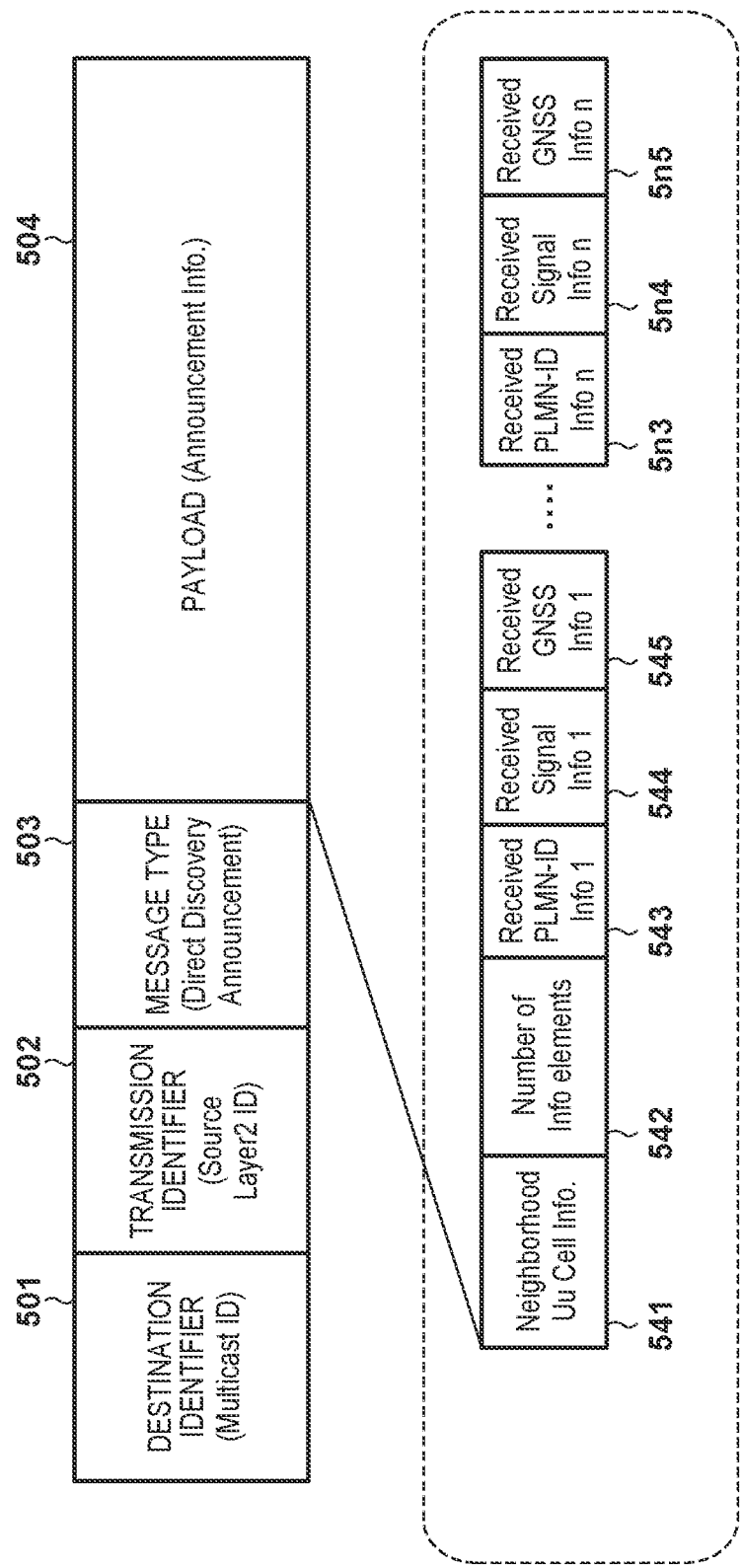
FIG. 5 is a diagram illustrating an example of a format of a notification message transmitted in a direct wireless communication according to the first embodiment that notifies the reception of an informing signal of another wireless communication system.

Next, a format of a wireless communication system message transmitted in the direct wireless communication according to the present embodiment will be described with reference to FIG. 5. FIG. 5 is an example of a wireless communication system message using a direct communication protocol NR-PC5 for local 5G.

A destination identifier 501 is a region in which a Multicast ID or a Groupcast ID designating a wireless communication apparatus that is a transmission destination is designated, and in the present embodiment, for example, a Multicast ID receivable by a plurality of wireless communication apparatuses in a system is set.

A transmission source identifier 502 is a region in which an identifier that can identify a wireless communication apparatus being a transmission source is designated, and in the present embodiment, a Layer 2 ID is set. A message type 503 represents a type of a message using the NR-PC5, and in the present embodiment, the message type is set to a value representing "Direct Discovery Announcement".

A payload 504 stores information related to an informing signal received by a wireless communication apparatus that transmits a message 500. In the payload 504, Neighborhood Uu Cell Info 541 representing the total number of neighbor wireless base stations detected and an information element 542 representing the number of pieces of information to be notified for each of the base stations are stored as payload header information. Further, the payload 504 includes Received PLMN-ID Info 543 including identification information of the BS 11A that is a transmission source of an informing signal, and Received Signal Info 544 including information such as a reception signal quality, a channel, and a slot of the informing signal. Furthermore, the payload 504 includes a Received GNSS Info 545 including at least one of location information and time information of the wireless communication apparatus that has received the informing signal. Note that, in a case where one payload reports the reception of informing signals from a plurality of wireless base stations, a plurality of combinations of the Received PLMN-ID Info, the Received Signal Info, and the Received GNSS Info is stored in the payload as illustrated in FIG. 5.

The Received Signal Info 544 and the Received GNSS Info 545 may be determined based on a synchronization signal acquired from the GNSS.

Next, an example of a format of a message for notifying a wireless base station that the wireless communication apparatus 12 has received a notification message by the direct wireless communication will be described with reference to FIG. 6.

Figure 6:
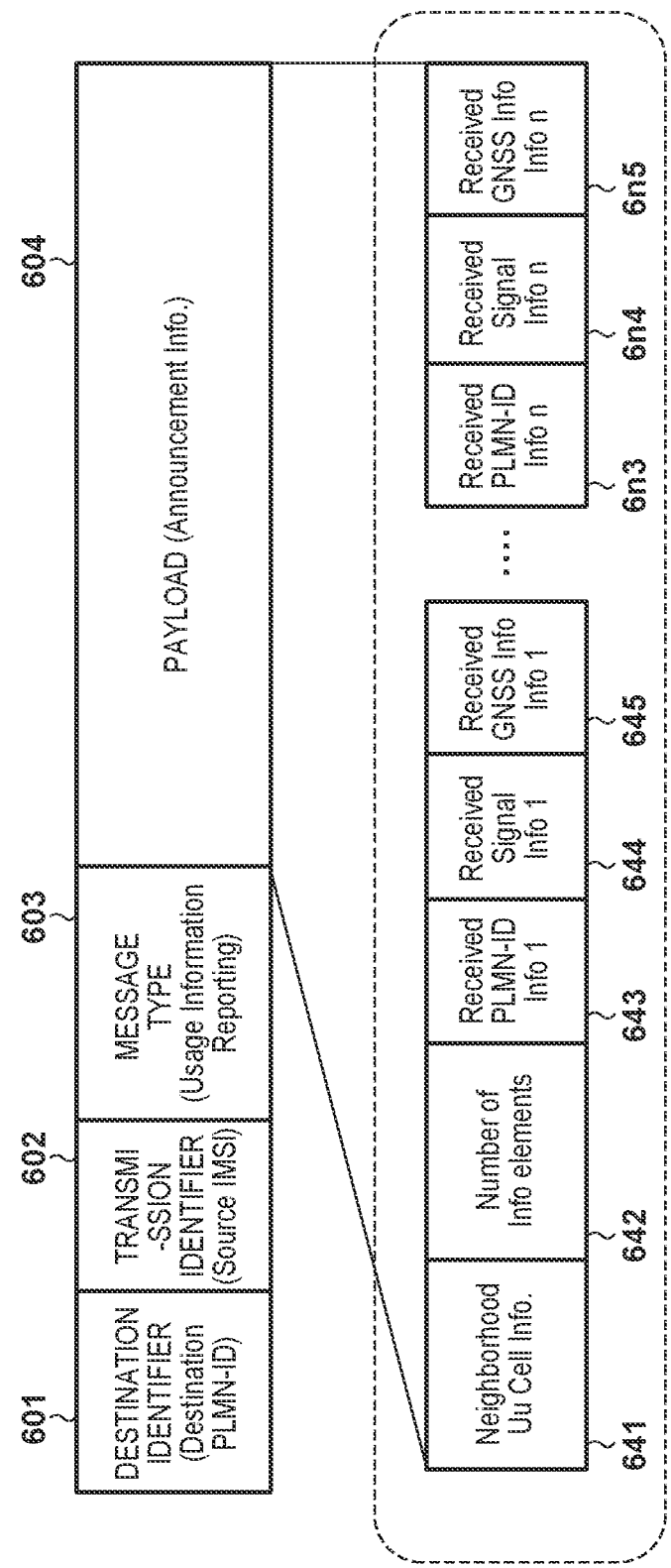
FIG. 6 is a diagram illustrating an example of a format of a message for notifying a base station that the wireless communication apparatus according to the first embodiment has received the notification message in the direct wireless communication.

The notification message in FIG. 6 is used when the UE 12A transmits a notification message (Usage Information Reporting message) to the wireless network management apparatus 10A in S408.

A destination identifier 601 is a Public Land Mobile Network-Identifier (PLMN-ID) of a destination of the user information reporting message. In a transmission source identifier 602, the identifier of the UE 12A is set, and specifically IMSI of the UE 12A is set, for example. A message type 603 is information representing the type of a message, and in the present embodiment, a value representing Usage Information Reporting is set. In a payload 604, information similar to the payload 504 received in FIG. 5 is set, and thus the description thereof is omitted.

Next, a flowchart illustrating an example of processing executed by the wireless communication apparatus 12 according to the first embodiment will be described with reference to FIG. 7. The processing in FIG. 7 will be described as being executed when the UE 12B receives a system informing signal.

First, in S701, the UE 12B identifies PLMN-ID information included in the informing signal received. Subsequently, in S702, the UE 12B determines whether or not the PLMN-ID included in the informing signal matches the PLMN-ID of the base station 11B of the wireless communication system in which the UE 12B is participating.

Figure 7:
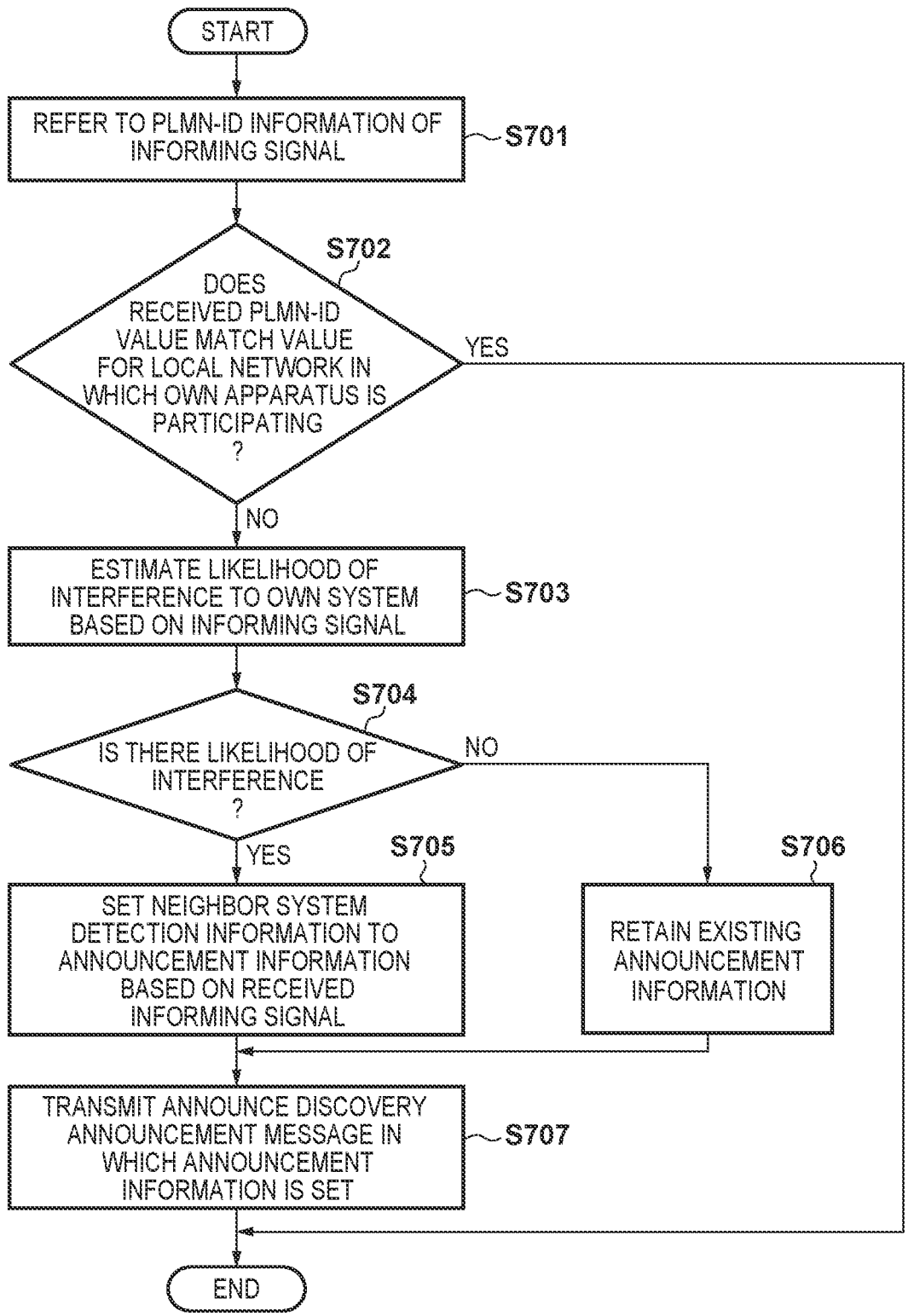
FIG. 7 is a flowchart illustrating an example of processing executed by the wireless communication apparatus according to the first embodiment.

When it is determined that the PLMN-1D included in the system informing signal received matches the PLMN-ID of the base station 11B of the wireless communication system in which the UE 12B is participating (Y in S702), the UE 12B ends the processing illustrated in FIG. 7. When it is determined that the PLMN-ID included in the informing signal received does not match the PLMN-ID of the base station 11B of the wireless communication system in which the UE 12B is participating (N in S702), the UE 12B causes the processing to proceed to S703.

In S703, the UE 12B determines the likelihood of an interference to the system in which the UE 12B is participating based on the informing signal. For example, the UE 12B determines a received electric field intensity and an SN ratio (signal-to-noise ratio) of the informing signal received.

Subsequently, in S704, the UE 12B determines whether or not the likelihood of an interference to the system 1B in which the UE 12B is participating is high. In one example, the UE 12B determines whether or not the signal intensity of the system informing signal received from BS 11A is greater than a predetermined threshold. For example, the UE 12B estimates that there is no likelihood of the interference when the received electric field intensity of the informing signal is lower than an electric field intensity defined in the own system. When the received electric field intensity exceeds the electric field intensity, information of a wireless channel used for the system notified by an information element in the informing signal is checked.

The UE 12B causes the processing to proceed to S705 when the likelihood of the interference is determined to be high (Y in S704), or to S706 when the likelihood of the interference is determined to be not high.

In S706, announcement information waiting to be transmitted is retained. In the S705, based on the system informing signal received, neighbor system detection information for notifying the BS 11A that a wireless communication apparatus of another wireless communication system has received system notification information is set in the announcement information. That is, in a case where the UE 12B has received informing signals from base stations of a plurality of other wireless communication systems during a predetermined period of time, the UE 12B sets a plural pieces of neighbor system detection information in the announcement information.

Subsequently, in S707, a discovery announcement message in which the announcement information is set is transmitted.

Next, an example of processing executed by the UE 12A that has received the discovery announcement message from the UE 12B via the direct wireless communication will be described with reference to FIG. 8. The processing in FIG. 8 will be described as being executed when the UE 12A receives the discovery announcement message from the UE 12B.

First, the UE 12A acquires the announcement information of the received discovery announcement message in S801, and determines whether or not the neighbor system detection information is included in the announcement information in S802.

The UE 12A causes the processing to proceed to S803 when it is determined that the neighbor system detection information is included in the announcement information (Y in S802), or to S805 when it is determined that the neighbor system detection information is not included in the announcement information.

Figure 8:
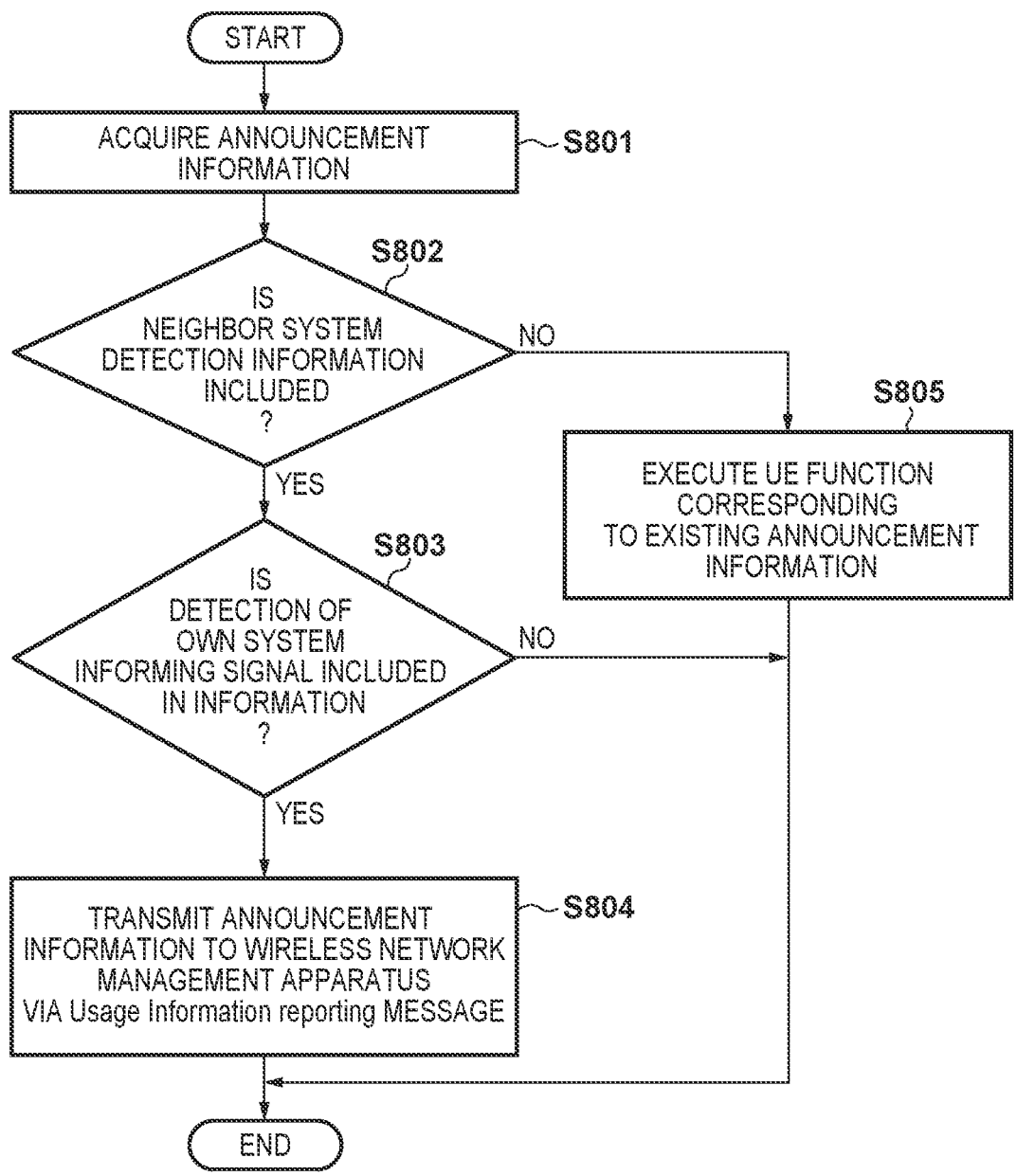
FIG. 8 is an example of a flowchart of an additional control performed by a wireless communication apparatus that has received a wireless communication system detection notification message from the wireless communication apparatus according to the first embodiment via the direct wireless communication.

In S805, the UE 12A executes UE control processing corresponding to existing announcement information, and ends the processing of FIG. 8.

In S803, the UE 12A determines whether or not the neighbor system detection information includes a notification of a detection of a system informing signal of the wireless communication system 1A in which the UE 12A is participating. When the discovery announcement message includes neighbor system detection information notifying that the informing signal of the wireless communication system 1A in which the UE 12A is participating is received (Y in S803), the UE 12A causes the processing to proceed to S804. In S804, the UE 12A transmits the announcement information to the wireless network management apparatus 10A via a Usage Information Reporting message. When the discovery announcement message includes neighbor system detection information notifying that a system informing signal of a wireless communication system in which the UE 12A is not participating is detected (N in S803), the UE 12A ends the processing in FIG. 8.

Next, an example of processing executed by the wireless network management apparatus 10A that has received the Usage Information Reporting message from the UE 12A will be described with reference to FIG. 9.

Figure 9:
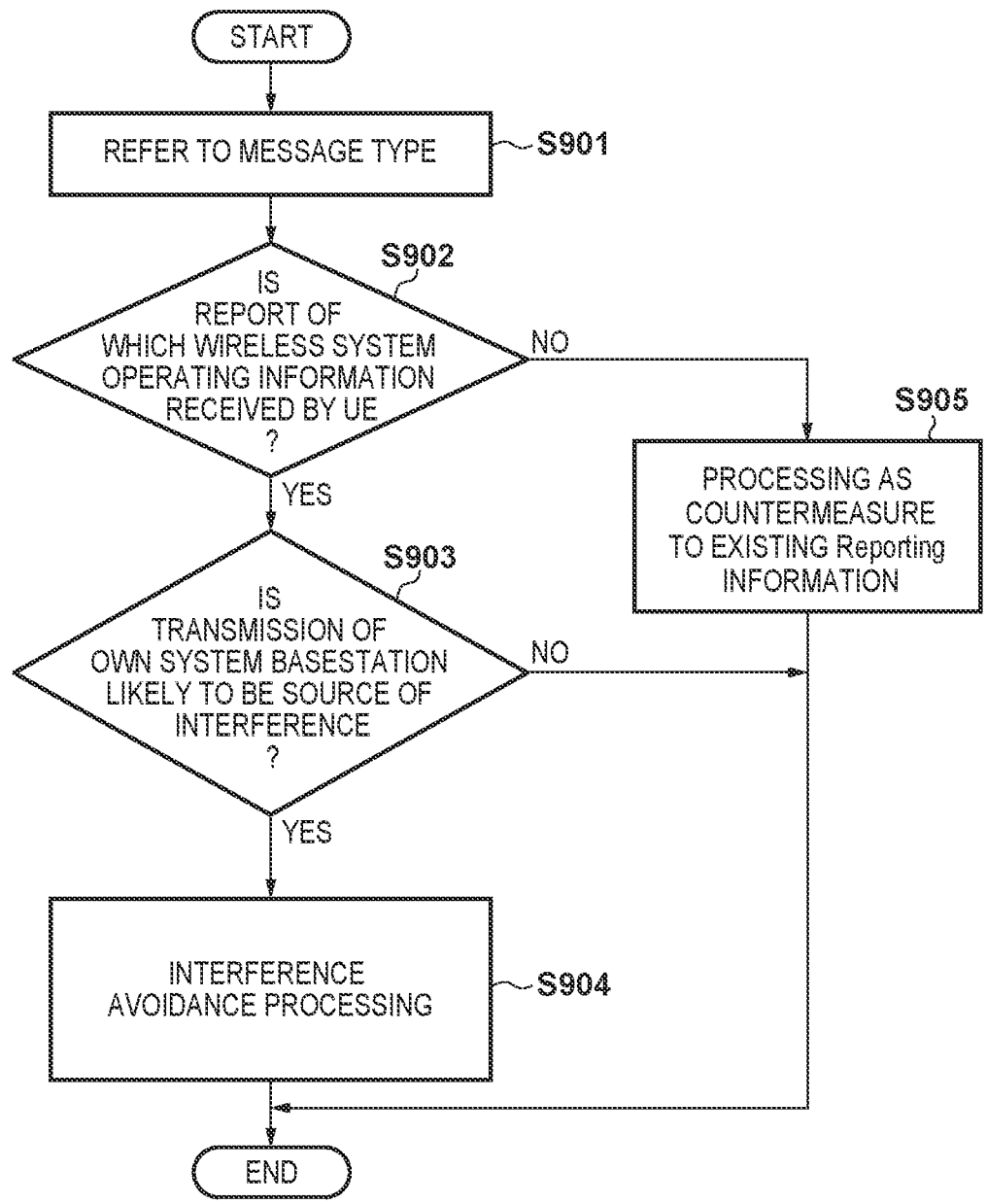
FIG. 9 is an example of a flowchart of an additional control performed by a wireless network management apparatus that has received an operating information notification message of a wireless communication system from the wireless communication apparatus according to the first embodiment via a wireless communication through a base station.

The processing illustrated in FIG. 9 is executed by the wireless network management apparatus 10A that has received the Usage Information Reporting message from the UE 12A of the wireless communication system 1A.

First, in S901, the wireless network management apparatus 10A determines the message type 603. When the message type is determined to be Usage Information Reporting in S902 (Y in S902), the wireless network management apparatus 10A causes the processing to proceed to S903. When the message type is determined to be not Usage Information Reporting (N in S902), the wireless network management apparatus 10A causes the processing to proceed to S905, and executes processing corresponding to an existing message.

In S903, the wireless network management apparatus 10A determines whether or not transmission from the BS 11A is highly likely to interfere with another system. For example, when the value of the reception intensity (Received Signal Info) of an informing signal transmitted from the BS 11A, which is acquired from the UE 12B, is equal to or greater than a predetermined threshold value, it may be determined that transmission from the BS 11A is highly likely to interfere with another system.

Also, when a TDD pattern for C-plane communication for receiving an informing signal is synchronized with another wireless communication system and a frequency channel for U-plane communication for receiving a discovery announcement message is different from that of the other wireless communication system, it may be determined that there is no interference.

When it is determined that transmission from the BS 11A is highly likely to interfere with another system (Y in S903), the wireless network management apparatus 10A causes the processing to proceed to S904, and performs interference avoidance processing. In the present embodiment, the interference avoidance processing includes adjustment of communication parameters such as reduction in transmission power of the BS 11A, adjustment of antenna directivity of the BS 11A, change of TDD slot assignment, and change of frequency channels used for communication such as a U-plane communication channel. The wireless network management apparatus 10A selects communication parameters depending on the content of detection information of the wireless communication system, and indicates the application of the selected communication parameters from the NG-RAN of the wireless network management apparatus 10A to the BS 11A.

As described above, according to the present embodiment, the wireless network management apparatus can detect the likelihood that the movement of a wireless base station under the control of the wireless network management apparatus would cause an occurrence of an interference with a wireless communication apparatus of another wireless communication system. Accordingly, the wireless network management apparatus can execute countermeasure processing for avoiding the interference with respect to the wireless base station under the control thereof, and thus can prevent the occurrence of the interference to another system.

Second Embodiment

In the present embodiment, processing in which the wireless communication apparatus 12A transmits a discovery request message for requesting announcement information and collects the reception status of a neighbor wireless base station as a response message to the discovery request message will be described. Note that the same configurations, functions, and processing as those of the first embodiment are denoted by the same reference numerals and the description thereof is omitted.

Figure 10:
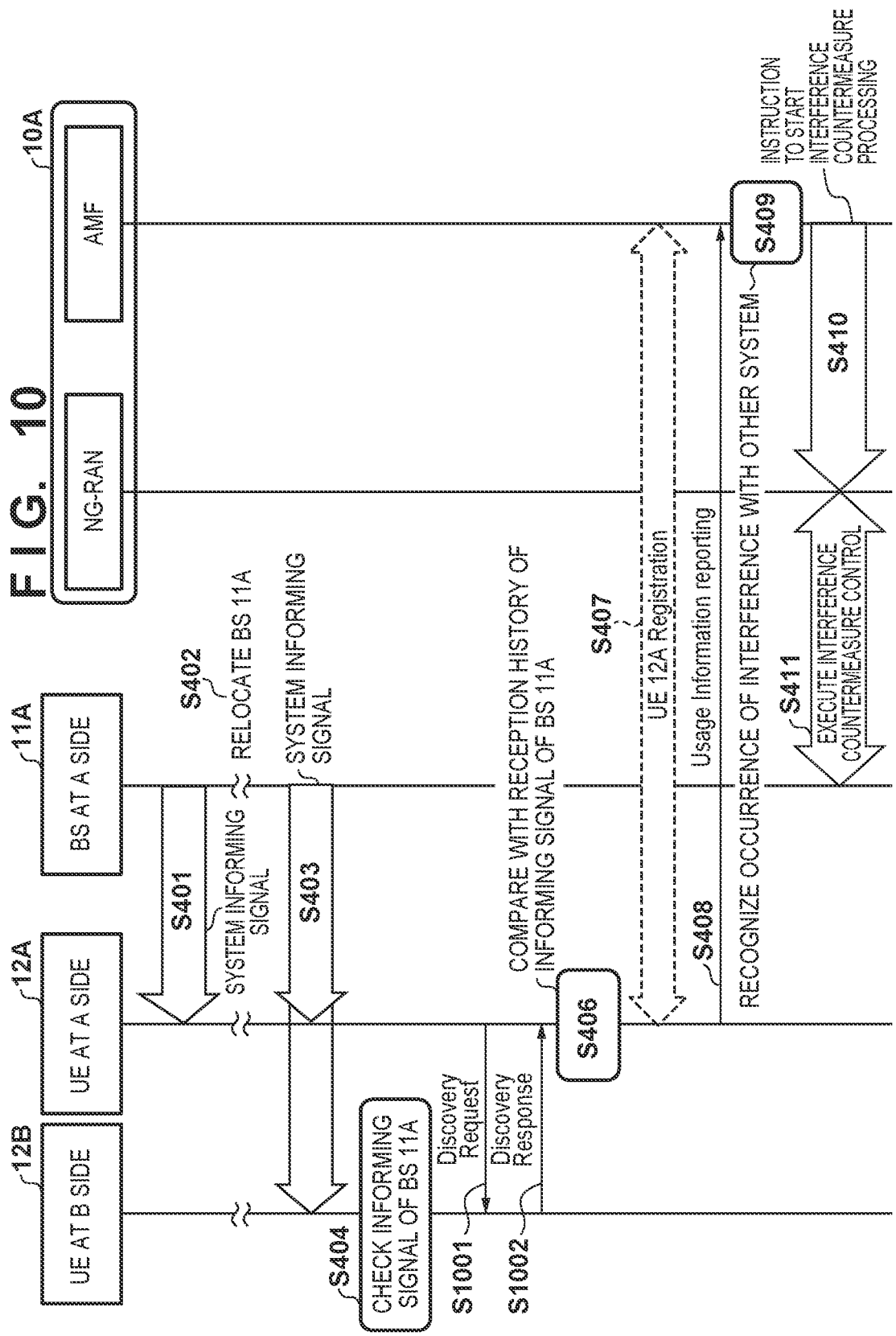
FIG. 10 is a sequence diagram illustrating an example of processing executed by a wireless communication system according to a second embodiment when wireless communication apparatuses come close to each other.

An example of processing executed by a wireless communication system according to the present embodiment when a plurality of wireless communication apparatuses come close to each other will be described with reference to FIG. 10.

The processing in S401 to S404 is similar to the processing described above with reference to FIG. 4, and thus the description thereof is omitted.

In S1001, the UE 12A transmits a discovery request message at a predetermined time interval via the direct wireless communication. In S1002, the UE 12B that has received the discovery request message transmits to the UE 12A a discovery response (search response) message for reporting a system informing signal received.

Hereafter, the processing in S406 to S411 is similar to the processing described above with reference to FIG. 4, and thus the description thereof is omitted.

Figure 11:
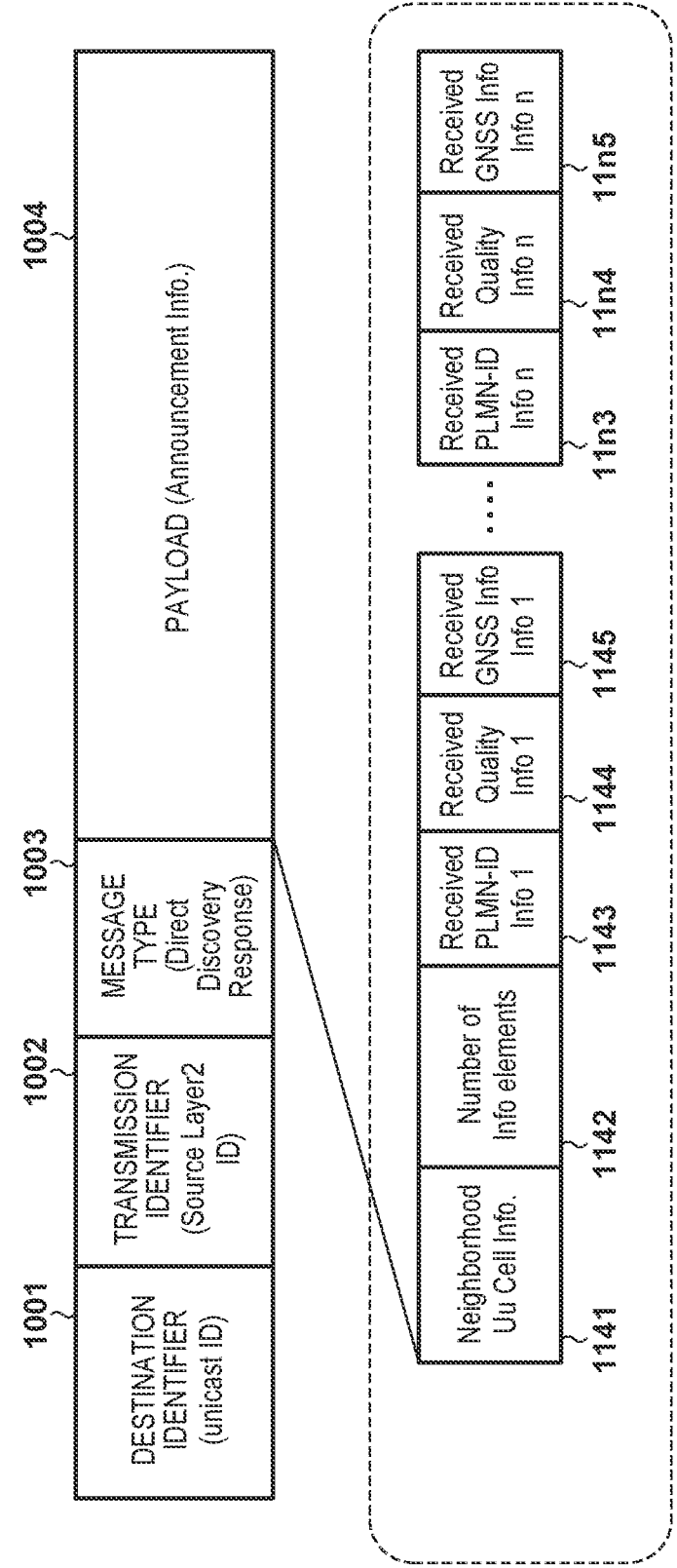
FIG. 11 is a diagram illustrating an example of a format of an operating information notification message of a wireless communication system transmitted in a direct wireless communication according to the second embodiment.

Next, a format of a discovery response message transmitted in S1002 in FIG. 10 will be described with reference to FIG. 11.

The discovery response message includes a destination identifier 1101, a transmission source identifier 1102, a message type 1103, and a payload 1104.

The destination identifier 1101 represents a destination of the discovery response message, and a Unicast ID of the UE 12A that has transmitted the discovery request message is set. The transmission source identifier 1102 is a region in which a Layer 2 ID that can identify the wireless communication apparatus that is a transmission source is designated. The message type 1103 represents a type of signaling using the NR-PC5, and in the present embodiment, the type of signaling is set to a value representing "Direct Discovery Response".

The payload 1104 stores announcement information including information for notifying a TDD pattern in the wireless communication system. In the payload 1104, Neighborhood Uu Cell Info 1141 representing the total number of neighbor wireless base stations detected and an information element 1142 representing the number of pieces of information to be notified for each of the base stations are stored as payload header information. Further, the payload 1104 includes Received PLMN-ID Info 1143 including identification information of the BS 11A that is a transmission source of the informing signal received, and Received Quality Info 1144 including information such as a quality, a channel, and a slot of the informing signal. Furthermore, the payload 1104 includes a Received GNSS Info 1145 including at least one of location information and time information of the wireless communication apparatus that has received the informing signal. Note that, in a case where one payload reports the reception of informing signals from a plurality of wireless base stations, a plurality of combinations of the Received PLMN-ID Info, the Received Quality Info, and the Received GNSS Info is stored in the payload as illustrated in FIG. 11.

Figure 12:
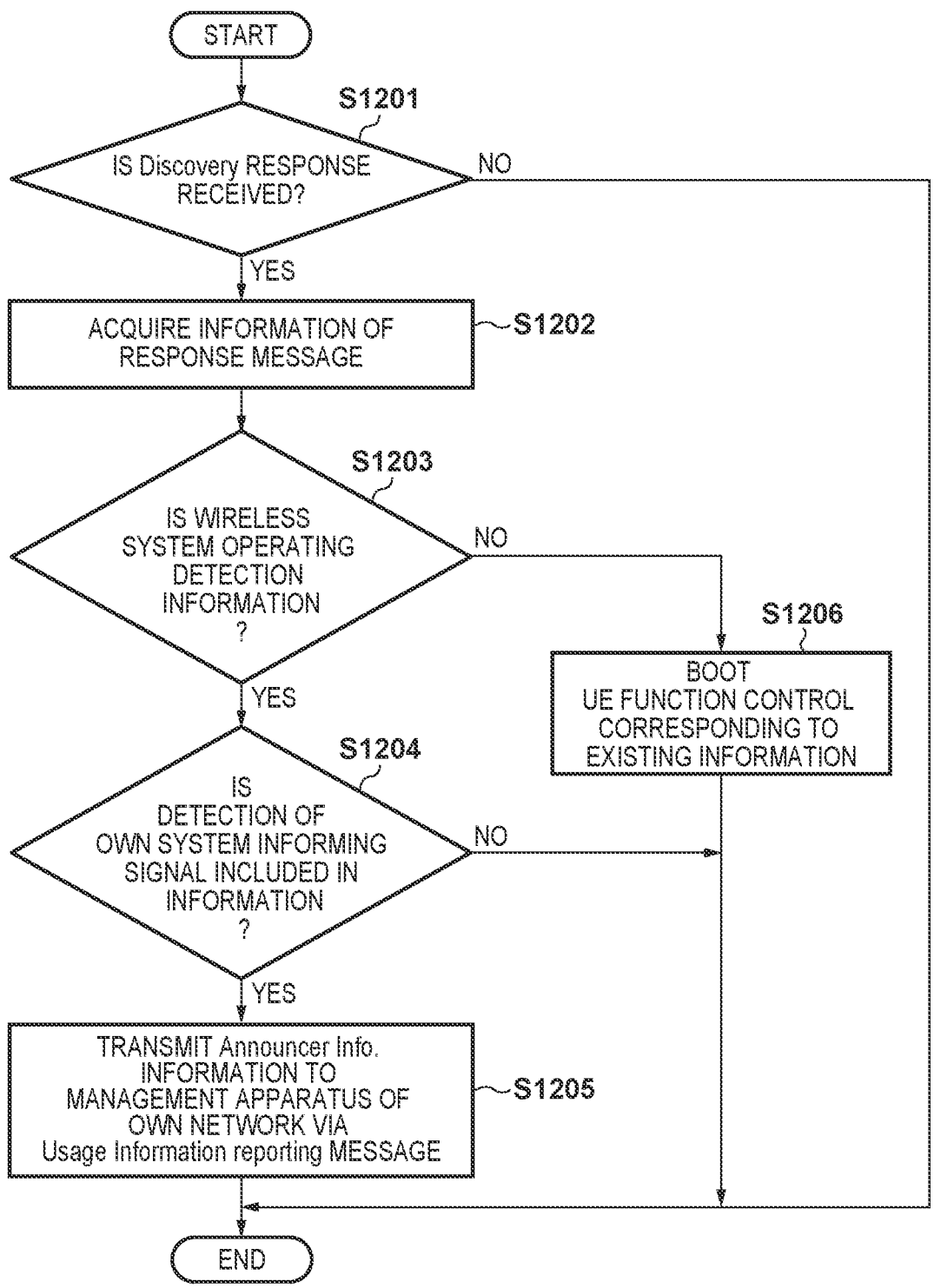
FIG. 12 is an example of a flowchart of an additional control performed by a wireless communication apparatus that has received the operating information notification message of the wireless communication system from the wireless communication apparatus according to the second embodiment via the direct wireless communication.

Next, an example of processing executed by the UE 12A will be described with reference to FIG. 12. The processing illustrated in FIG. 12 is executed when the UE 12A transmits a discovery request message by the NR-PC5.

First, in S1201, the UE 12A waits until a discovery response message is received. When the discovery response message is received (Y in S1201), the processing proceeds to S1202, and information of the discovery response message is acquired.

Hereafter, the processing in S1203 to S1206 is similar to the processing in S802 to S805 in FIG. 8, and thus the description thereof is omitted.

As described above, according to the present embodiment, the wireless network management apparatus can detect that the wireless communication system controlled by the wireless network management apparatus interferes with another wireless communication system due to the relocation of the wireless base station under the control of the wireless network management apparatus, even by using processing of messages transmitted and received by a NR-PC5 communication medium. This allows the wireless network management apparatus to execute processing for avoiding a radio frequency interference such as the control of transmission power from a base station, and consequently an interference can be avoided without operation by a licensee of a wireless network system.

OTHER EMBODIMENTS

In the above description, the NR-PC5 interface is used for the direct wireless communication, and an NR-Uu interface is used for the wireless communication with a base station, but other wireless communication technologies can be employed. For example, a wireless LAN interface compliant with the IEEE 802.11 series standard may be used for the direct wireless communication. Also, a wireless PAN interface compliant with the IEEE 802.15 series standard may be used for the wireless communication with a base station.

In addition, in the present embodiment, description is given that one wireless communication system includes one BS 11 and one UE 12, but may include a plurality of BSes 11 and a plurality of UEs 12.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-136654, filed Aug. 24, 2021 which is hereby incorporated by reference herein in its entirety.

What is claimed is:

1. A wireless communication apparatus comprising:
one or more memories storing instructions; and
one or more processors coupled to the one or more memories,
wherein execution of the instructions causes the one or more processors to function as:
a first wireless communication unit configured to perform wireless communication with a base station;
a second wireless communication unit configured to perform wireless communication between wireless communication apparatuses not via a base station;
a reception unit configured to receive a message from a second wireless communication apparatus via the second wireless communication unit, the message notifying that an informing signal transmitted from a first base station belonging to a first wireless communication system to which the wireless communication apparatus belongs is received by the second wireless communication apparatus belonging to a second wireless communication system different from the first wireless communication system; and
a notification unit configured to notify the first base station that the message is received by the reception unit, via the first wireless communication unit.

2. The wireless communication apparatus according to claim 1, wherein the message uses a message format for broadcast notification.

3. The wireless communication apparatus according to claim 1, wherein the message uses a message format for search response.

4. The wireless communication apparatus according to claim 1, wherein the message includes a reception signal quality of the informing signal received.

5. The wireless communication apparatus according to claim 1, wherein the second wireless communication unit is an NR-PC5 interface for a fifth generation mobile communication system, and
the first wireless communication unit is an NR-Uu interface for a fifth generation mobile communication system.

6. The wireless communication apparatus according to claim 1, wherein the message includes at least one of location information and time information acquired by satellite communication positioning.

7. The wireless communication apparatus according to claim 1, wherein the execution of the instructions causes the one or more processors to further function as a determination unit configured to determine whether or not an apparatus transmitting the message and an apparatus receiving the message belong to different wireless communication systems, wherein the notification unit makes no notification when it is determined that the apparatus transmitting the message and the apparatus receiving the message belong to an identical wireless communication system.

8. A wireless communication apparatus comprising:
one or more memories storing instructions; and
one or more processors coupled to the one or more memories,
wherein execution of the instructions causes the one or more processors to function as:
a first wireless communication unit configured to perform wireless communication with a base station;
a second wireless communication unit configured to perform wireless communication between wireless communication apparatuses not via a base station;
a notification unit configured to notify, when an informing signal transmitted from a second base station belonging to a second wireless communication system different from a first wireless communication system to which the wireless communication apparatus belongs is received via the first wireless communication unit, a second wireless communication apparatus belonging to the second wireless communication system that a message notifying of receiving the informing signal is received, via the second wireless communication unit.

9. A control method for a wireless communication apparatus, the wireless communication apparatus being capable of performing a first wireless communication via a base station and a second wireless communication not via a base station, comprising:
receiving a message from a second wireless communication apparatus via the second wireless communication, the message notifying that an informing signal transmitted from a first base station belonging to a first wireless communication system to which the wireless communication apparatus belongs is received by the second wireless communication apparatus belonging to a second wireless communication system different from the first wireless communication system; and notifying the first base station that the message is received, via the first wireless communication.

10. A non-transitory computer-readable storage medium storing a program executed by a wireless communication apparatus, the wireless communication apparatus being capable of performing a first wireless communication via a base station and a second wireless communication not via a base station, the program comprising:

receiving a message from a second wireless communication apparatus via the second wireless communication, the message notifying that an informing signal transmitted from a first base station belonging to a first wireless communication system to which the wireless communication apparatus belongs is received by the second wireless communication apparatus belonging to a second wireless communication system different from the first wireless communication system; and notifying the first base station that the message is received, via the first wireless communication.

11. A base station forming a wireless network, the base station comprising:

one or more memories storing instructions; and one or more processors coupled to the one or more memories, wherein execution of the instructions causes the one or more processors to function as:

a wireless communication unit configured to perform wireless communication with a first wireless communication belonging to the wireless network;

a transmission unit configured to transmit an informing signal; and a reception unit configured to receive a message, from a first wireless communication apparatus, the message indicating that the informing signal is received by a second wireless communication apparatus belonging to a second wireless communication system different from the first wireless communication system.

* * * * *